United States Patent
Chen et al.

(10) Patent No.: US 11,764,933 B2
(45) Date of Patent: Sep. 19, 2023

(54) INFORMATION TRANSMISSION METHOD, TERMINAL, AND NETWORK DEVICE

(71) Applicant: VIVO MOBILE COMMUNICATION CO., LTD., Guangdong (CN)

(72) Inventors: Xiaohang Chen, Guangdong (CN); Xueming Pan, Guangdong (CN); Zhi Lu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 262 days.

(21) Appl. No.: 16/950,699

(22) PCT Filed: May 17, 2019

(86) PCT No.: PCT/CN2019/087359
§ 371 (c)(1),
(2) Date: Nov. 17, 2020

(87) PCT Pub. No.: WO2019/219072
PCT Pub. Date: Nov. 21, 2019

(65) Prior Publication Data
US 2021/0218537 A1    Jul. 15, 2021

Related U.S. Application Data

(63) Continuation of application No. PCT/CN2019/087359, filed on May 17, 2019.

(30) Foreign Application Priority Data

May 18, 2018  (CN) .......................... 201810479414.5

(51) Int. Cl.
*H04L 5/00*    (2006.01)
*H04L 1/1812*  (2023.01)

(52) U.S. Cl.
CPC .......... *H04L 5/0055* (2013.01); *H04L 1/1812* (2013.01)

(58) Field of Classification Search
CPC combination set(s) only.
See application file for complete search history.

(56) References Cited

U.S. PATENT DOCUMENTS 10,506,468 B2 * 12/2019 Nammi ................. H04W 28/04
11,303,419 B2 *  4/2022 Yang ...................... H04W 72/53
(Continued)

FOREIGN PATENT DOCUMENTS

| CN | 103312468 A   | 9/2013 |
| CN | 107409014 A   | 11/2017 |
| WO | 2017028001 A1 | 2/2017 |

OTHER PUBLICATIONS

Examination Report for IN Application No. IN202027053319 dated on Dec. 14, 2021,7 Pages.

(Continued)

*Primary Examiner* — Hanh N Nguyen
(74) *Attorney, Agent, or Firm* — BROOKS KUSHMAN P.C.

(57) ABSTRACT

An information transmission method, a terminal, and a network device are provided, and the method includes: acquiring a non-overlapped candidate Physical Downlink Shared Channel (PDSCH) occasion in a time domain transmission unit; determining, according to the candidate PDSCH occasion, a Hybrid Automatic Repeat Request Acknowledge (HARQ-ACK) codebook corresponding to the time domain transmission unit; transmitting the HARQ-ACK codebook. Wherein, at least one candidate PDSCH occasion in the time domain transmission unit corresponds to at least two pieces of HARQ-ACK information.

18 Claims, 6 Drawing Sheets

(56) References Cited

U.S. PATENT DOCUMENTS

| | | | |
|---|---|---|---|
| 11,387,951 B2* | 7/2022 | Peng | H04B 7/0478 |
| 2018/0006791 A1 | 1/2018 | Marinier et al. | |
| 2018/0019843 A1 | 1/2018 | Papasakellariou | |
| 2021/0226759 A1* | 7/2021 | Takeda | H04L 5/0055 |
| 2021/0273752 A1* | 9/2021 | Takeda | H04L 1/1896 |
| 2021/0314033 A1* | 10/2021 | Fakoorian | H04W 72/535 |
| 2022/0131649 A1* | 4/2022 | Gou | H04L 1/1854 |
| 2022/0174659 A1* | 6/2022 | Lu | H04W 72/048 |
| 2022/0174709 A1* | 6/2022 | Chen | H04W 72/1273 |
| 2022/0255706 A1* | 8/2022 | Song | H04W 72/0446 |

OTHER PUBLICATIONS

Notice of Reasons for Refusal for Japanese Patent Application No. 2020-564605, dated Jan. 19, 2022, 3 Pages.

NPL document of Discussion and Decision for 3GPP TS WG1 Meeting on Corrections on CA operation, dated from May 21-25, 2018, 5 Pages.

NPL document of Discussion and Decision for 3GPP TSG WG1 Meeting #92bis on DL Scheduling for URLLC, dated from May 21-25, 2018, 3 Pages.

NPL document of Discussion and Decision for 3GPP TSG WG1 Meeting #93 on Parallel DL reception, dated from May 21-25, 2018, 2 Pages.

First Office Action for Korean Application No. 10-2020-7036437, dated Sep. 22, 2022, 5 Pages.

Vivo, "Discussion on eMBB and URLLC UCI Multiplexing," 3GPP TSG RAN WG1 #93, Agenda item 7.2.3.2.3, May 21-25, 2018, R1-1806064, Busan, Korea, 4 Pages.

* cited by examiner

| Receiving a HARQ-ACK codebook corresponding to a non-overlapped candidate Physical Downlink Shared Channel (PDSCH) occasion in a time domain transmission unit | 101 |

INFORMATION TRANSMISSION METHOD, TERMINAL, AND NETWORK DEVICE

CROSS-REFERENCE TO RELATED APPLICATION

The present application is a continuation application of International Application No. PCT/CN2019/087359 filed on May 17, 2019, which claims priority of Chinese Patent Application No. 201810479414.5 filed on May 18, 2018, both of which are incorporated herein by reference in their entireties.

TECHNICAL FIELD

The present disclosure relates to the field of communications technologies, and in particular, relates to an information transmission method, a terminal, and a network device.

BACKGROUND

5th-generation (5th Generation, 5G) mobile communication systems are required to adapt to more diverse scenarios and service requirements. Main scenarios for new radio (New radio, NR) include enhanced mobile broadband (enhanced Mobile Broadband, eMBB), massive machine type of communication (massive Machine Type of Communication, mMTC) and ultra-reliable and low latency communications (Ultra-Reliable and Low Latency Communications, URLLC), these scenarios put forward requirements for the system such as high reliability, low latency, large bandwidth, and wide coverage, etc.

A terminal may multiplex hybrid automatic repeat request acknowledge (Hybrid Automatic Repeat Request ACK, HARQ-ACK) corresponding to multiple downlink data channels in an uplink transmission channel, such as a physical uplink control channel (Physical Uplink Control Channel, PUCCH) or a physical uplink shared channel (Physical Uplink Shared Channel, PUSCH). These HARQ-ACKs form a HARQ-ACK codebook (codebook), which is transmitted on a PUCCH or a PUSCH.

There are two ways to determine the HARQ-ACK codebook, including: a dynamic determination way and a semi-static determination way. In a case that the terminal is configured with a dynamic HARQ-ACK codebook, slots (slot) corresponding to the dynamic HARQ-ACK codebook is determined, but a physical downlink shared channel (Physical Downlink Shared Channel, PDSCH) received within each slot changes dynamically. The terminal may determine a number of received PDSCHs according to a received downlink scheduling signaling (DL grant), thereby determining the HARQ-ACK codebook. Thus a size of the HARQ-ACK codebook changes dynamically. In a case that the terminal is configured with a semi-static HARQ-ACK codebook, slots corresponding to the semi-static HARQ-ACK codebook and a number of candidate physical downlink shared channel (Physical Downlink Shared Channel, PDSCH) occasions within each slot are determined. The terminal determines a corresponding HARQ-ACK codebook according to candidate PDSCH occasions within each corresponding slot. As shown in FIG. 1, the slot includes 3 candidate PDSCH occasions, namely, candidate PDSCH occasion 1, candidate PDSCH occasion 2, and candidate PDSCH occasion 3. Generally, each candidate PDSCH occasion includes one or more possible PDSCH transmission positions. For example, the candidate PDSCH occasion 1 includes three possible PDSCH transmission positions, the candidate PDSCH occasion 2 includes two possible PDSCH transmission positions, and the candidate PDSCH occasion 3 includes one possible PDSCH transmission position. All PDSCH transmission positions included in a candidate PDSCH occasion correspond to a piece of HARQ-ACK information, that is, each candidate PDSCH occasion corresponds to one piece of HARQ-ACK information, for example, the candidate PDSCH occasion 1 corresponds to ACK/NACK1, the candidate PDSCH occasion 2 corresponds to ACK/NACK2, the candidate PDSCH occasion 3 corresponds to ACK/NACK3.

For terminals capable of supporting different services, a network device may dynamically schedule transmission of different services within a same slot, and transmission resources of different services overlap in time. For example, as shown in FIG. 2, the terminal may support simultaneous reception of a PDSCH of the eMBB and a PDSCH of the URLLC, wherein the PDSCH of the eMBB and the PDSCH of the URLLC overlap in a time domain and are independent of each other in a frequency domain. Since the PDSCH of the eMBB and the PDSCH of the URLLC overlap in the time domain, as shown in FIG. 3, the PDSCH of the eMBB and the PDSCH of the URLLC may correspond to a same candidate PDSCH occasion. When the terminal determines a HARQ-ACK codebook of the slot, the HARQ-ACK codebook determined by the candidate PDSCH occasion may only include a ACK/NACK of a PDSCH of one service, and may not provide feedback on multiple service transmissions received simultaneously.

SUMMARY

An embodiment of the present disclosure provides an information transmission method, a terminal, and a network device.

In a first aspect, an embodiment of the present disclosure provides an information transmission method, and the method is applied on a terminal side and includes:
  acquiring a non-overlapped candidate Physical Downlink Shared Channel (PDSCH) occasion in a time domain transmission unit;
  determining, according to the candidate PDSCH occasion, a Hybrid Automatic Repeat Request Acknowledge (HARQ-ACK) codebook corresponding to the time domain transmission unit; wherein, at least one candidate PDSCH occasion in the time domain transmission unit corresponds to at least two pieces of HARQ-ACK information;
  transmitting the HARQ-ACK codebook.

In a second aspect, an embodiment of the present disclosure further provides a terminal, and the terminal includes:
  an acquisition module, configured to acquire a non-overlapped candidate Physical Downlink Shared Channel (PDSCH) occasion in a time domain transmission unit;
  a determination module, configured to determine, according to the candidate PDSCH occasion, a Hybrid Automatic Repeat Request Acknowledge (HARQ-ACK) codebook corresponding to the time domain transmission unit; wherein, at least one candidate PDSCH occasion in the time domain transmission unit corresponds to at least two pieces of HARQ-ACK information;
  a transmitting module, configured to transmit the HARQ-ACK codebook.

In a third aspect, an embodiment of the present disclosure provides a terminal, and the terminal includes a processor and a storage, the storage stores a program executable by the processor, the program is executed by the processor to implement steps of the information transmission method as described above.

In a fourth aspect, an embodiment of the present disclosure provides an information transmission method. The method is applied on a network device side and includes:

receiving a HARQ-ACK codebook corresponding to a non-overlapped candidate Physical Downlink Shared Channel (PDSCH) occasion in a time domain transmission unit; wherein, at least one candidate PDSCH occasion in the time domain transmission unit corresponds to at least two pieces of HARQ-ACK information.

In a fifth aspect, an embodiment of the present disclosure provides a network device, and the network device includes:

a reception module, configured to receive a HARQ-ACK codebook corresponding to a non-overlapped candidate Physical Downlink Shared Channel (PDSCH) occasion in a time domain transmission unit; wherein, at least one candidate PDSCH occasion in the time domain transmission unit corresponds to at least two pieces of HARQ-ACK information.

In a sixth aspect, an embodiment of the present disclosure further provides a network device, the network device includes a processor, a storage and a program stored on the storage and executable by the processor, and the processor executes the program to implement steps of the information configuration method as described above.

In a seventh aspect, an embodiment of the present disclosure provides a computer readable storage medium, the computer readable storage medium stores a program, and the program is executed by the processor to implement steps of the information transmission method at the terminal side as described above, or to implement steps of the information transmission method at the network device side as described above.

BRIEF DESCRIPTION OF THE DRAWINGS

In order to more clearly illustrate the technical solutions in embodiments of the present disclosure, the drawings used in the description of the embodiments of the present disclosure will be briefly introduced below. Obviously, the drawings in the following description are only some embodiments of the present disclosure. Based on these drawings, other drawings may be obtained by those skilled in the art without any creative work.

DETAILED DESCRIPTION

Figure 1:
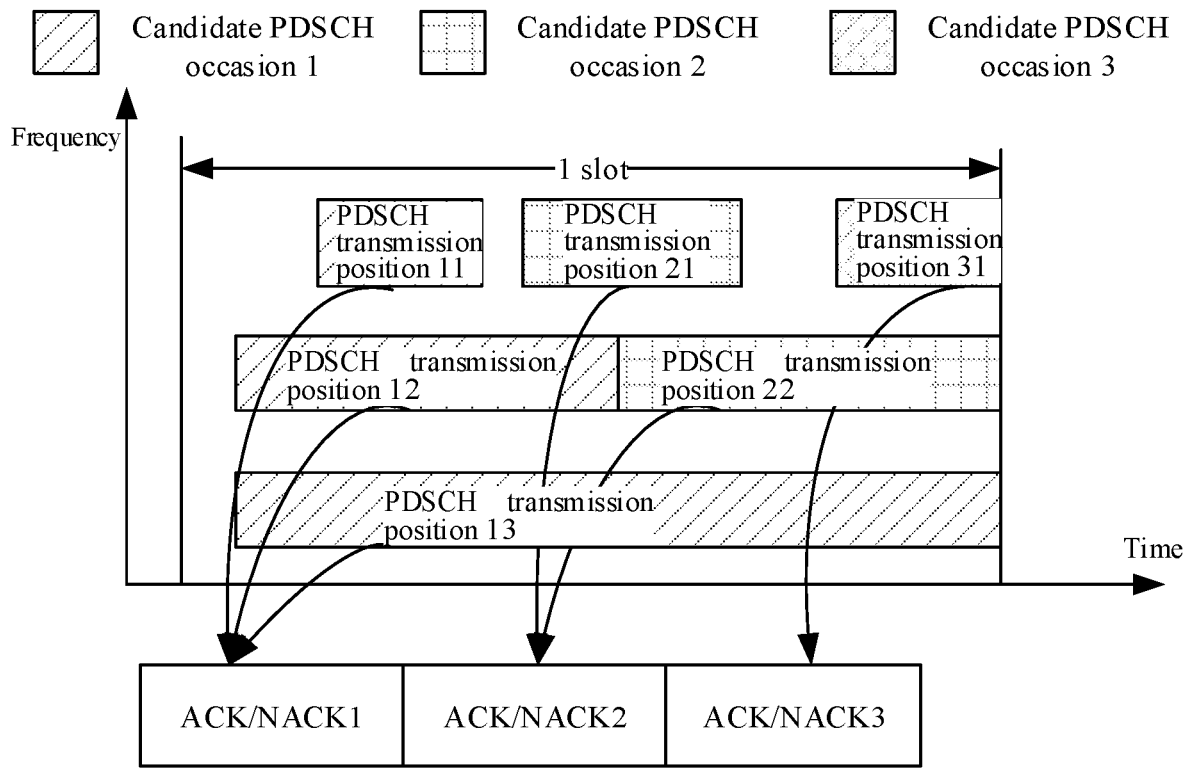
FIG. 1 shows a schematic diagram of a mapping relationship between a HARQ-ACK codebook and candidate PDSCH occasions.
Figure 2:
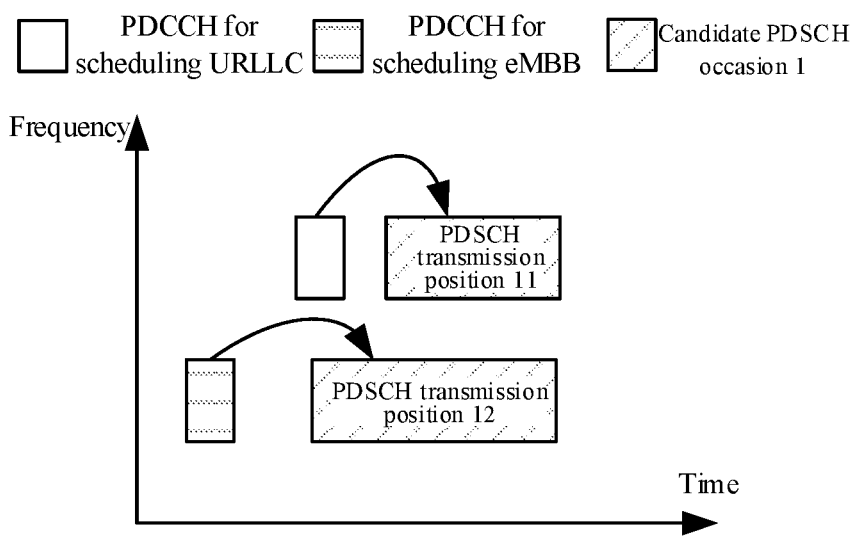
FIG. 2 shows a schematic diagram of PDSCH resource scheduling of different services.

Exemplary embodiments of the present disclosure will be described in more detail below with reference to the accompanying drawings. Although exemplary embodiments of the present disclosure are shown in the drawings, it should be understood that the present disclosure may be implemented in various forms, without being limited by the embodiments described herein. Rather, these embodiments are provided so that the present disclosure will be thorough and complete, and will fully convey the scope of the present disclosure to those skilled in the art.

The terms "first", "second", and the like in the specification and claims of the present disclosure are used to distinguish similar objects, and are not necessarily used to describe a particular order or chronological order. It is to be understood that the data so used may be interchangeable under appropriate circumstances, so that the embodiments of the present application described herein can be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. The term "and/or" in the specification and claims indicates at least one of connected objects.

The technology described herein is not limited to long time evolution (Long Time Evolution, LTE)/LTE-Advanced (LTE-Advanced, LTE-A) systems, and may also be used in various wireless communication systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA) and other systems. The terms "system" and "network" are often used interchangeably. CDMA systems may implement radio technologies such as CDMA2000 and universal terrestrial radio access (Universal Terrestrial Radio Access, UTRA). The UTRA includes wideband code division multiple access (Wideband Code Division Multiple Access, WCDMA) and other CDMA variants. TDMA systems may implement radio technologies such as global system for mobile communication (Global System for Mobile Communication, GSM). OFDM systems may implement radio technologies such as ultra mobile broadband (Ultra Mobile Broadband, UMB), evolution-UTRA (Evolution-UTRA, E-UTRA), IEEE 802.11 (Wi-Fi), IEEE 802.16 (WiMAX), IEEE 802.20, and Flash-OFDM. The UTRA and the E-UTRA are part of a universal mobile telecommunications system (Universal Mobile Telecommunications System, UMTS). The LTE and more advanced LTE (such as LTE-A) are new UMTS versions that use the E-UTRA. The UTRA, the E-UTRA, the UMTS, the LTE, the LTE-A, and the GSM are described in documents from an organization named "3rd generation partnership project" (3rd Generation Partnership Project, 3GPP). The CDMA2000 and the UMB are described in documents from an organization named "3rd Generation Partnership Project 2" (3GPP2). The technologies described herein may be used for the systems and radio technologies mentioned above, as well as other systems and radio technologies. However, the following description describes an NR system for exemplary purposes, and NR terminology is used in most of the description below, although these technologies may also be applied to applications other than NR system applications.

The following description provides examples and does not limit the scope, applicability, or configuration set forth in the claims. Changes may be made to functions and arrangements of the discussed elements without departing from spirit and scope of the present disclosure. Various examples may omit, substitute, or add various procedures or components as appropriate. For example, the described method may be performed in an order different from that described, and various steps may be added, omitted, or combined. In addition, features described with reference to certain examples may be combined in other examples.

Figure 4:
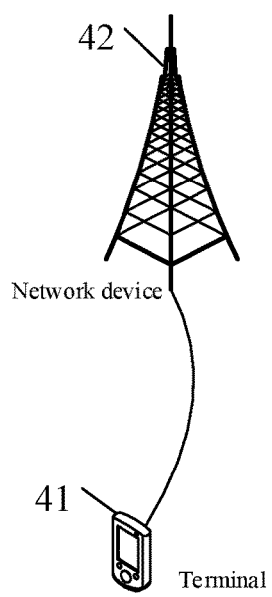
FIG. 4 shows a block diagram of a mobile communication system to which an embodiment of the present disclosure may be applied.

Referring to FIG. 4, FIG. 4 shows a block diagram of a wireless mobile communication system to which an embodiment of the present disclosure may be applied. The wireless communication system includes a terminal 41 and a network device 42. The terminal 41 may also be referred to as terminal equipment or user equipment (User Equipment, UE). The terminal 41 may be a mobile phone, a tablet personal computer (Tablet Personal Computer), a laptop computer (Laptop Computer), a personal digital assistant (Personal Digital Assistant, PDA), a mobile Internet device (Mobile Internet Device, MID), a wearable device (Wearable Device) or an in-vehicle device and other terminal side devices, it should be noted that a specific type of the terminal 41 is not limited in an embodiment of the present disclosure. The network device 42 may be a base station or a core network, wherein the base station may be a base station of 5G and later versions (such as, a next generation node base station (next generation node base station, gNB)), a 5G new radio node base station ((5G new radio node base station, 5G NR NB), etc.), or a base station in other communication systems (such as, an evolved node base station (evolved node base station, eNB), an access point in a wireless local area network (Wireless Local Area Network, WLAN), or other access points, etc.), wherein the base station may be called a Node B, an evolved Node B, an access Point, a base transceiver station (Base Transceiver Station, BTS), a radio base station, a radio transceiver, a basic service set (Basic Service Set, BSS), an extended service set (Extended Service Set, ESS), a NodeB, an evolved Node B (Evolved Node B, eNB), a home Node B, a home evolved Node B, a WLAN access point, a Wi-Fi node, or some other appropriate terms in the field, as long as the same technical effect is achieved, the base station is not limited to specific technical vocabulary. It should be noted that, in an embodiment of the present disclosure, only the base station in the NR system is taken as an example, but the specific type of the base station is not limited.

The base station may communicate with the terminal 41 under the control of the base station controller. In various examples, the base station controller may be a part of a core network or part of some base stations. Some base stations may communicate control information or user data with a core network through backhaul. In some examples, some of these base stations may directly or indirectly communicate with each other through a backhaul link, and the backhaul link may be a wired or wireless communication link. The wireless communication system may support operations on multiple carriers (waveform signals of different frequencies). A multi-carrier transmitter may simultaneously transmit modulated signals on these multiple carriers. For example, each communication link may be a multi-carrier signal modulated based on various radio technologies. Each modulated signal may be sent on different carriers and may carry control information (such as, reference signals, control channels, etc.), overhead information, data, and so on.

The base station may perform wireless communicate with the terminal 41 via one or more access point antennas. Each base station may provide communication coverage for corresponding coverage area thereof. Coverage area of an access point may be divided into sectors that constitute only a part of the coverage area. The wireless communication system may include different types of base stations (such as, macro base stations, micro base stations, or pico base stations). The base station may also use different radio technologies, such as cellular or WLAN radio access technologies. The base stations may be associated with the same or different access networks or operator deployments. Coverage areas of different base stations (including coverage areas of the same or different types of base stations, coverage areas using the same or different radio technologies, or coverage areas belonging to the same or different access networks) may overlap.

Communication links in the wireless communication system may include an uplink for carrying uplink (Uplink, UL) transmission (for example, from the terminal 41 to the network device 42), or a downlink for carrying downlink (Downlink, DL) transmission (for example, from the network device 42 to the terminal 41). The UL transmission may also be referred to as reverse link transmission, and the DL transmission may also be referred to as forward link transmission. Downlink transmission may be performed on a licensed band, an unlicensed band or both. Similarity, uplink transmission may be performed on a licensed band, an unlicensed band or both.

Figure 5:
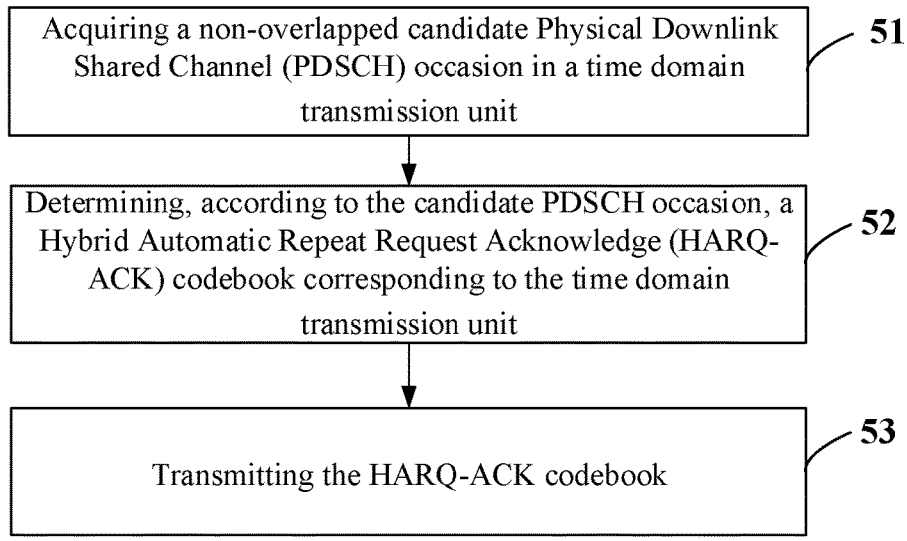
FIG. 5 shows a schematic flowchart illustrating an information transmission method at a terminal side according to an embodiment of the present disclosure.

An embodiment of the present disclosure provides an information transmission method applied on a terminal side. As shown in FIG. 5, the method includes Step 51 to Step 53.

Step 51: acquiring a non-overlapped candidate Physical Downlink Shared Channel (PDSCH) occasion in a time domain transmission unit.

The time domain transmission unit may be a time domain resource unit for semi-static scheduling of PDSCH of a network device. A time domain transmission unit includes at least one slot, that is, one time domain transmission unit may be one or more slots. Taking one slot as an example, at least one non-overlapped candidate PDSCH occasion (occasion) may be included within one slot, for example, three non-overlapped candidate PDSCH occasions are included within one slot, namely, candidate PDSCH occasion 1, candidate PDSCH occasion 2 and candidate PDSCH occasion 3.

Step 51 may be implemented by, but not limited to, the following manner: the terminal determines a candidate PDSCH occasion in the time domain transmission unit according to a network configuration or a predefined time domain resource allocation (Time Domain Resource Allocation) table.

Step 52: determining, according to the candidate PDSCH occasion, a Hybrid Automatic Repeat Request Acknowledge (HARQ-ACK) codebook corresponding to the time domain transmission unit.

The terminal is configured with a semi-static HARQ-ACK codebook, and a time domain transmission unit corresponds to a semi-static HARQ-ACK codebook. A time domain transmission unit may include at least one candidate PDSCH occasion, a candidate PDSCH occasion may include at least one PDSCH transmission position. A number of PDSCH transmission positions included in different candidate PDSCH occasions may be different. For example, the candidate PDSCH occasion 1 includes three PDSCH transmission positions, the candidate PDSCH occasion 2 includes two PDSCH transmission positions, and the candidate PDSCH occasion 1 includes one PDSCH transmission position. For the HARQ-ACK codebook, at least one candidate PDSCH occasion in the time domain transmission unit corresponds to at least two pieces of HARQ-ACK information, that is, there is at least one candidate PDSCH occasion corresponding to at least two pieces of HARQ-ACK information in the time domain transmission unit. It should be noted that, there may also be a candidate PDSCH occasion corresponding to one piece of HARQ-ACK information in the time domain transmission unit.

Step 53: transmitting the HARQ-ACK codebook.

In a case that the network device schedules PDSCHs of different services to different PDSCH transmission positions of a same candidate PDSCH occasion, ACK-ACK information corresponding to each PDSCH occasion in the candidate PDSCH occasion may be used to provide transmission feedback on the PDSCHs of different services, so that providing feedback on multiple service transmissions received simultaneously may be realized, and reliability of simultaneous transmission of different services is improved.

Implementation of Step 53 includes, but is not limited to, the following manners:

Manner 1: the terminal determines a HARQ-ACK codebook corresponding to the time domain transmission unit according to a number of non-overlapped candidate PDSCH occasions in the time domain transmission unit.

In this manner, the HARQ-ACK codebook includes n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit. In this manner, a number of pieces of HARQ-ACK information actually corresponding to each candidate PDSCH in the time domain transmission unit is the same. The determination of a value of the n includes, but is not limited to, the following manners.

n may be a predefined value, for example, n is defined as 2 in a protocol.

Or, n may be a value determined based on terminal capability, for example, the terminal may support reception of PDSCHs of two services, so n is determined to be 2.

Or, n may be a number of PDSCH transmission positions included in a target candidate PDSCH occasion, wherein the target candidate PDSCH is a candidate PDSCH that includes most PDSCH transmission positions in the time domain transmission unit. For example, the candidate PDSCH occasion 1 and the candidate PDSCH occasion 3 in the time domain transmission unit include one PDSCH transmission position, and the candidate PDSCH occasion 2 includes two PDSCH transmission positions, so n is 2.

Figure 6:
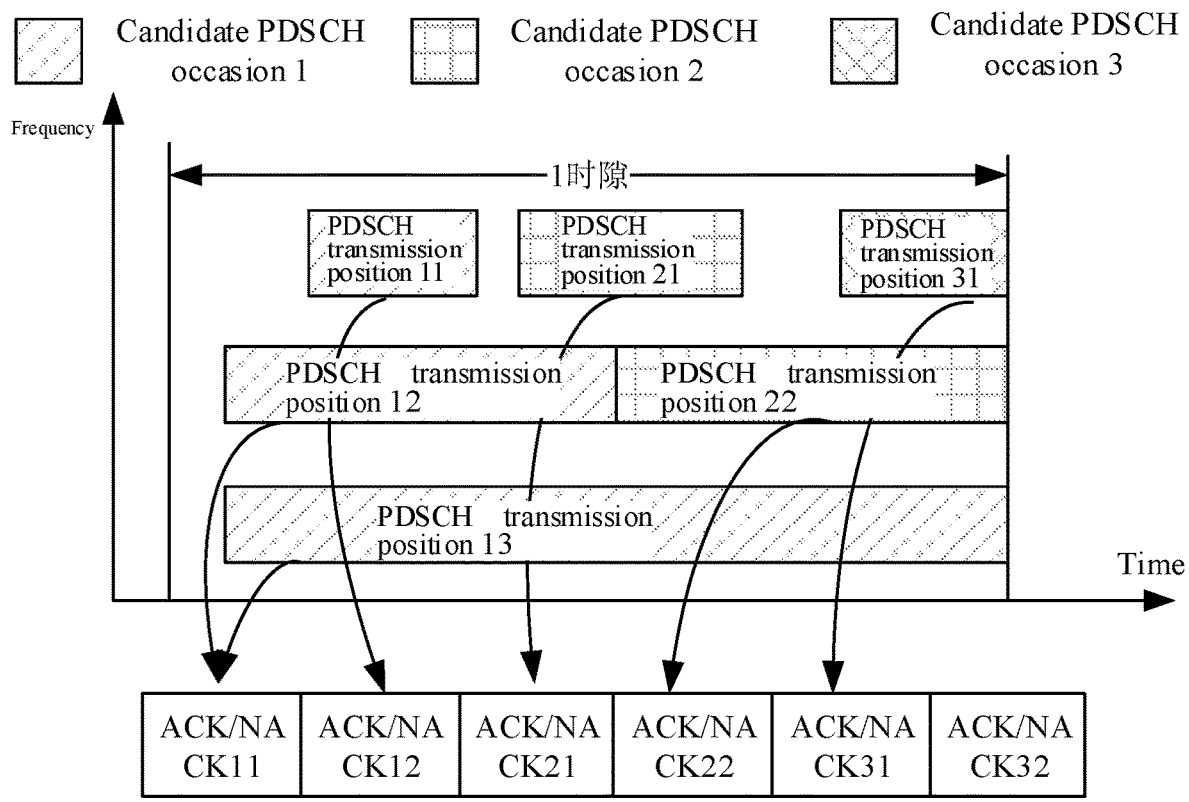
FIG. 6 shows a first schematic diagram of a mapping relationship between a HARQ-ACK codebook and candidate PDSCH occasions according to an embodiment of the present disclosure.

In a case that the terminal is configured with a semi-static HARQ-ACK codebook and each slot corresponding to the semi-static HARQ-ACK codebook, the terminal determines a candidate PDSCH occasion according to a network configuration or a predefined time domain resource allocation table. The HARQ-ACK codebook corresponding to the slot includes n*M pieces of HARQ-ACK information, one piece of HARQ-ACK information includes N bits, and N is a positive integer. In a case that the terminal supports both eMBB service and URLLC service, as shown in FIG. 6, in a certain slot, a number of non-overlapped candidate PDSCH occasions is determined to be 3 according to the time domain resource allocation table, namely, candidate PDSCH occasion 1, candidate PDSCH occasion 2, and candidate PDSCH occasion 3. The candidate PDSCH occasion 1 includes three PDSCH transmission positions that overlap in a time domain, namely, PDSCH transmission position 11, PDSCH transmission position 12, and PDSCH transmission position 13. The candidate PDSCH occasion 2 includes two PDSCH transmission positions that overlap in a time domain, namely, PDSCH transmission position 21 and PDSCH transmission position 22. The candidate PDSCH occasion 3 includes one PDSCH transmission position, namely, PDSCH transmission position 31. The terminal determines that each candidate PDSCH occasion in the slot corresponds to two pieces of HARQ-ACK information, then the HARQ-ACK codebook corresponding to the slot includes 2*3=6 pieces of HARQ-ACK information, and the HARQ-ACK codebook includes 6*N bits.

Further, a position of HARQ-ACK information in the HARQ-ACK codebook is determined according to a time domain position of a candidate PDSCH occasion corresponding to the HARQ-ACK information. For example, HARQ-ACK information in the HARQ-ACK codebook is determined according to a starting time domain position of the candidate PDSCH occasion. One candidate PDSCH occasion corresponds to two pieces of HARQ-ACK information. As shown in FIG. 6, it is assumed that a starting time domain position of candidate PDSCH occasion 1 is earlier than that of candidate PDSCH occasion 2, and a starting time domain position of the candidate PDSCH occasion 2 is earlier than that of candidate PDSCH occasion 3, then the HARQ-ACK codebook sequentially has: ACK/NACK11 and ACK/NACK12 corresponding to the candidate PDSCH occasion 1, ACK/NACK21 and ACK/NACK22 corresponding to the candidate PDSCH occasion 2, ACK/NACK31 and ACK/NACK32 corresponding to the candidate PDSCH occasion 3. Further, positions of multiple pieces of HARQ-ACK information corresponding to a candidate PDSCH occasion are determined according to a starting time domain position of a PDSCH transmission position in this candidate PDSCH occasion. For example, as shown in FIG. 6, a starting time domain position of PDSCH transmission position 11 in the candidate PDSCH occasion 1 is later than that of PDSCH transmission positions 12 and 13, then the ACK/NACK 11 of the candidate PDSCH occasion 1 corresponds to the PDSCH transmission position 12 or 13, and the ACK/NACK 12 of the candidate PDSCH occasion 1 corresponds to the PDSCH transmission position 11. A starting time domain position of the PDSCH transmission position 21 in the candidate PDSCH occasion 2 is earlier than that of the PDSCH transmission position 22, then the ACK/NACK 21 of the candidate PDSCH occasion 2 corresponds to the PDSCH transmission position 21, and the ACK/NACK 22 of the candidate PDSCH occasion 2 corresponds to the PDSCH transmission position 22. The candidate PDSCH occasion 3 only includes one PDSCH transmission position 31, so the ACK/NACK 31 of the candidate PDSCH occasion 3 corresponds to the PDSCH transmission position 31, and the ACK/NACK 32 of the candidate PDSCH occasion 3 may transmit a NACK or a placeholder bit. It is assumed that the network device schedules a PDSCH of the URLLC service at the PDSCH transmission position 11 of the candidate PDSCH occasion 1, and schedules a PDSCH of the eMBB service at the PDSCH transmission position 12 of the candidate PDSCH occasion 1. A starting time of the PDSCH transmission position 12 of candidate PDSCH occasion 1 is earlier than that of the PDSCH transmission position 11 of candidate PDSCH occasion 1, therefore, the PDSCH transmission position 12 corresponding to the eMBB service corresponds to the ACK/NACK11, and the PDSCH transmission position 11 corresponding to the URLLC service corresponds to the ACK/NACK12.

In addition to determining the position sequence of HARQ-ACK information for a candidate PDSCH occasion, the following manner, in which positions of multiple pieces of HARQ-ACK information corresponding to a candidate PDSCH occasion are determined based on a type of a service, may also be adopted. For example, HARQ-ACK information in the HARQ-ACK codebook is determined according to a starting time domain position of the candidate PDSCH occasion. One candidate PDSCH occasion corresponds to two pieces of HARQ-ACK information, as shown in FIG. 6, the candidate PDSCH occasion 1 corresponds to the ACK/NACK11 and the ACK/NACK12, the candidate PDSCH occasion 2 corresponds to the ACK/NACK21 and the ACK/NACK22, and the candidate PDSCH occasion 3 corresponds to the ACK/NACK31 and the ACK/NACK32. Further, positions of multiple pieces of HARQ-ACK information corresponding to a candidate PDSCH occasion are determined based on a type of a service. For example, HARQ-ACK information with low service priority is placed at the top, as shown in FIG. 6, the ACK/NACK11 of the candidate PDSCH occasion 1 corresponds to a HARQ-ACK for eMBB service transmission, and the ACK/NACK12 of the candidate PDSCH occasion 1 corresponds to a HARQ-ACK for URLLC service transmission. Or, HARQ-ACK information with high service priority is at the top, the ACK/NACK11 of the candidate PDSCH occasion 1 corresponds to a HARQ-ACK for URLLC service transmission, and the ACK/NACK12 of the candidate PDSCH occasion 1 corresponds to a HARQ-ACK for eMBB service transmission, which is not shown in the figure. Manner 2: the terminal determines a HARQ-ACK codebook corresponding to the time domain transmission unit according to a number of non-overlapped candidate PDSCH occasions in the time domain transmission unit and a number of PDSCH transmission positions included in the candidate PDSCH occasions.

In this manner, the HARQ-ACK codebook includes $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion. In this manner, a number of pieces of HARQ-ACK information actually corresponding to each candidate PDSCH in the time domain transmission unit may be different. The determination of a value of the $n_m$ includes, but is not limited to, the following manners.

$n_m$ is a number of PDSCH transmission positions included in the m-th candidate PDSCH occasion. In this manner, a number of pieces of HARQ-ACK information corresponding to each candidate PDSCH occasion is the same as a number of PDSCH transmission positions included in each PDSCH candidate occasion. For example, in a case that the terminal is configured with a semi-static HARQ-ACK codebook and each slot corresponding to the semi-static HARQ-ACK codebook, the terminal determines a candidate PDSCH occasion according to a network configuration or a predefined time domain resource allocation table. The HARQ-ACK codebook corresponding to the slot includes $\Sigma_{m=1}^{M} n_m$ pieces of HARQ-ACK information, one piece of HARQ-ACK information includes N bits, and N is a positive integer. It is assumed that, in a certain slot, a number of non-overlapped candidate PDSCH occasions is determined to be 3 according to the time domain resource allocation table, namely, candidate PDSCH occasion 1, candidate PDSCH occasion 2, and candidate PDSCH occasion 3. The candidate PDSCH occasion 1 includes three PDSCH transmission positions that overlap in a time domain, namely, PDSCH transmission position 11, PDSCH transmission position 12, and PDSCH transmission position 13, then $n_1$ is 3. The candidate PDSCH occasion 2 includes two PDSCH transmission positions that overlap in a time domain, namely, PDSCH transmission position 21 and PDSCH transmission position 22, then $n_2$ is 2. The candidate PDSCH occasion 3 includes one PDSCH transmission position, namely, PDSCH transmission position 31, then $n_3$ is 1. Then the HARQ-ACK codebook corresponding to the slot includes 3+2+1=6 pieces of HARQ-ACK information, and the HARQ-ACK codebook includes 6*N bits.

Further, a position of HARQ-ACK information in the HARQ-ACK codebook is determined according to a time domain position of a candidate PDSCH occasion corresponding to the HARQ-ACK information. For example, HARQ-ACK information in the HARQ-ACK codebook is determined according to a starting time domain position of the candidate PDSCH occasion. For example, a starting time domain position of the candidate PDSCH occasion 1 is earlier than that of the candidate PDSCH occasion 2, and a starting time domain position of the candidate PDSCH occasion 2 is earlier than that of the candidate PDSCH occasion 3, then the HARQ-ACK codebook sequentially has: ACK/NACK11, ACK/NACK12 and ACK/NACK3 corresponding to the candidate PDSCH occasion 1, ACK/NACK21 and ACK/NACK22 corresponding to the candidate PDSCH occasion 2, ACK/NACK31 corresponding to the candidate PDSCH occasion 3, which is not shown in the present example figure. Further, positions of multiple pieces of HARQ-ACK information corresponding to a candidate PDSCH occasion are determined according to a starting time domain position of a PDSCH transmission position in this candidate PDSCH occasion. A starting time domain position of PDSCH transmission position 11 in the candidate PDSCH occasion 1 is later than that of the PDSCH transmission positions 12 and 13, then the ACK/NACK 11 of the candidate PDSCH occasion 1 corresponds to the PDSCH transmission position 12 or 13, and the ACK/NACK 12 of the candidate PDSCH occasion 1 corresponds to the PDSCH transmission position 11. A starting time domain position of the PDSCH transmission position 21 in the candidate PDSCH occasion 2 is earlier than that of the PDSCH transmission position 22, then the ACK/NACK 21 of the candidate PDSCH occasion 2 corresponds to the PDSCH transmission position 21, and the ACK/NACK 22 of the candidate PDSCH occasion 2 corresponds to the PDSCH transmission position 22. The candidate PDSCH occasion 3 only includes one PDSCH transmission position 31, so the ACK/NACK 31 of the candidate PDSCH occasion 3 corresponds to the PDSCH transmission position 31, and the ACK/NACK 32 of the candidate PDSCH occasion 3 may transmit a NACK or a placeholder bit. It is assumed that the network device schedules a PDSCH of the URLLC service at the PDSCH transmission position 11 of the candidate PDSCH occasion 1, and schedules a PDSCH of the eMBB service at the PDSCH transmission position 12 of the candidate PDSCH occasion 1. A starting time of the PDSCH transmission position 12 is earlier than that of the PDSCH transmission position 11, therefore, the PDSCH transmission position 12 corresponding to the eMBB service corresponds to the ACK/NACK11, and the PDSCH transmission position 11 corresponding to the URLLC service corresponds to the ACK/NACK12.

In addition to determining the position sequence of HARQ-ACK information for a candidate PDSCH occasion, it may also be determined in the following manner. Positions of multiple pieces of HARQ-ACK information corresponding to a candidate PDSCH occasion are determined based on a type of a service. For example, HARQ-ACK information in the HARQ-ACK codebook is determined according to a starting time domain position of the candidate PDSCH occasion. The candidate PDSCH occasion 1 corresponds to the ACK/NACK11, the ACK/NACK12 and the ACK/NACK13, the candidate PDSCH occasion 2 corresponds to the ACK/NACK21 and the ACK/NACK22, and the candidate PDSCH occasion 3 corresponds to the ACK/NACK31. Further, positions of multiple pieces of HARQ-ACK information corresponding to a candidate PDSCH occasion are determined based on a type of a service. For example, HARQ-ACK information with low service priority is placed at the top, the ACK/NACK11 of the candidate PDSCH occasion 1 corresponds to a HARQ-ACK for eMBB service transmission, and the ACK/NACK12 of the candidate PDSCH occasion 1 corresponds to a HARQ-ACK for URLLC service transmission. Or, HARQ-ACK information with high service priority is at the top, the ACK/NACK11 of the candidate PDSCH occasion 1 corresponds to a HARQ-ACK for URLLC service transmission, and the ACK/NACK12 of the candidate PDSCH occasion 1 corresponds to a HARQ-ACK for eMBB service transmission.

In addition to determining $n_m$ based on a number of PDSCH transmission positions actually included in the m-th candidate PDSCH occasion, a value of $n_m$ may also be determined in the following manners.

$n_m$ has a first value when the number of PDSCH transmission positions included in the m-th candidate PDSCH occasion is greater than 1; $n_m$ has a second value when the number of PDSCH transmission positions included in the m-th candidate PDSCH occasion is equal to 1. The first value and the second value are predefined. For example, the first value is defined as 2 and the second value is defined as 1 in a protocol. Or, the first value may be determined based on terminal capability, for example, the terminal may support reception of PDSCHs of two services, so the first value is determined to be 2.

Figure 7:
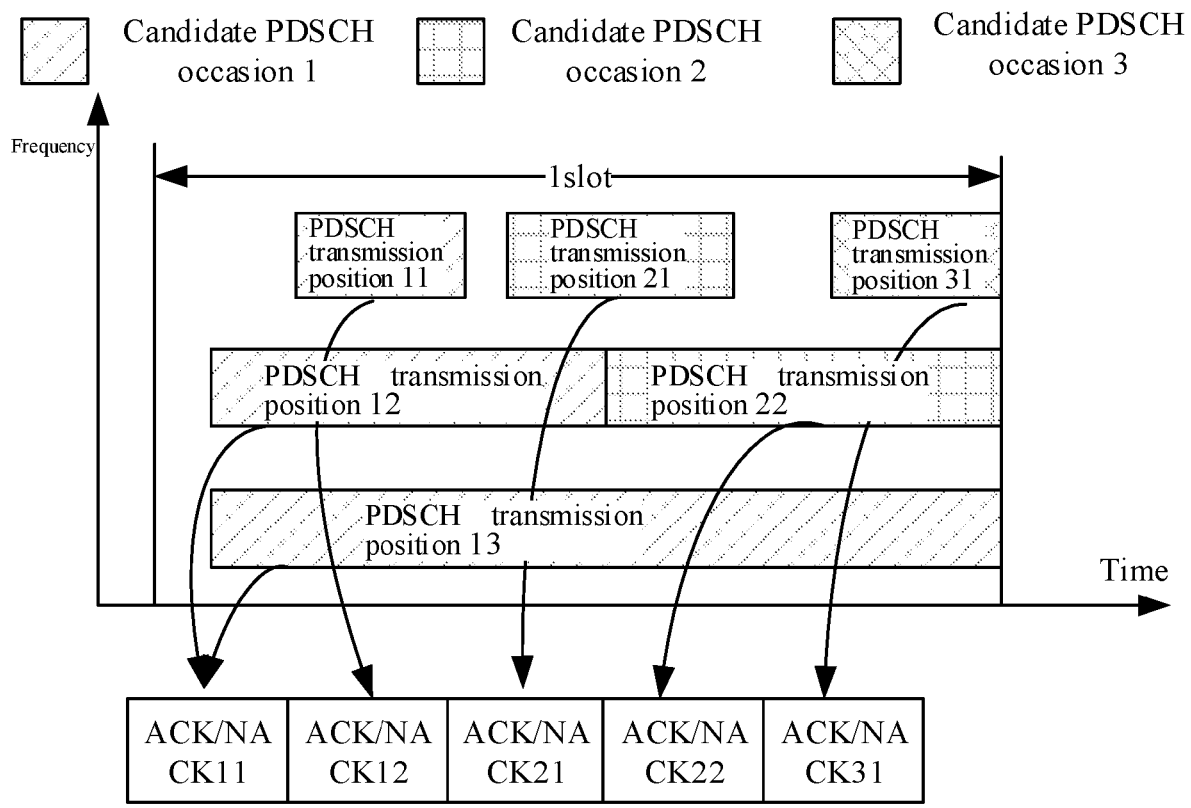
FIG. 7 shows a second schematic diagram of a mapping relationship between a HARQ-ACK codebook and candidate PDSCH occasions according to an embodiment of the present disclosure.

In a case that the terminal is configured with a semi-static HARQ-ACK codebook and each slot corresponding to the semi-static HARQ-ACK codebook, the terminal determines a candidate PDSCH occasion according to a network configuration or a predefined time domain resource allocation table. The HARQ-ACK codebook corresponding to the slot includes $\Sigma_{m=1}^{M} n_m$ pieces of HARQ-ACK information, one piece of HARQ-ACK information includes N bits, and N is a positive integer. Taking the first value of 2 and the second value of 1 as an example, it is assumed that, in a certain slot, a number of non-overlapped candidate PDSCH occasions is determined to be 3 according to the time domain resource allocation table, namely, candidate PDSCH occasion 1, candidate PDSCH occasion 2, and candidate PDSCH occasion 3. As shown in FIG. 7, the candidate PDSCH occasion 1 includes three PDSCH transmission positions that overlap in a time domain, namely, PDSCH transmission position 11, PDSCH transmission position 12, and PDSCH transmission position 13, then $n_1$ is the first value, that is, the $n_1$ is equal to 2. The candidate PDSCH occasion 2 includes two PDSCH transmission positions that overlap in a time domain, namely, PDSCH transmission position 21 and PDSCH transmission position 22, then $n_2$ is also 2. The candidate PDSCH occasion 3 includes one PDSCH transmission position that overlaps in a time domain, namely, PDSCH transmission position 31, then $n_3$ is the second value, that is, the $n_3$ is 1. Then the HARQ-ACK codebook corresponding to the slot includes 2+2+1=5 pieces of HARQ-ACK information, and the HARQ-ACK codebook includes 5*N bits.

Further, a position of HARQ-ACK information in the HARQ-ACK codebook is determined according to a time domain position of a candidate PDSCH occasion corresponding to the HARQ-ACK information. For example, HARQ-ACK information in the HARQ-ACK codebook is determined according to a starting time domain position of the candidate PDSCH occasion. For example, as shown in FIG. 7, a starting time domain position of the candidate PDSCH occasion 1 is earlier than that of the candidate PDSCH occasion 2, and a starting time domain position of the candidate PDSCH occasion 2 is earlier than that of the candidate PDSCH occasion 3, then the HARQ-ACK codebook sequentially has: ACK/NACK11, ACK/NACK12 and ACK/NACK3 corresponding to the candidate PDSCH occasion 1, ACK/NACK21 and ACK/NACK22 corresponding to the candidate PDSCH occasion 2, ACK/NACK31 corresponding to the candidate PDSCH occasion 3. Further, positions of multiple pieces of HARQ-ACK information corresponding to a candidate PDSCH occasion are determined according to a starting time domain position of a PDSCH transmission position in this candidate PDSCH occasion. For example, as shown in FIG. 7, a starting time domain position of the PDSCH transmission position 11 in the candidate PDSCH occasion 1 is later than that of PDSCH transmission positions 12 and 13, then the ACK/NACK 11 of the candidate PDSCH occasion 1 corresponds to the PDSCH transmission position 12 or 13, and the ACK/NACK 12 of the candidate PDSCH occasion 1 corresponds to the PDSCH transmission position 11. A starting time domain position of the PDSCH transmission position 21 in the candidate PDSCH occasion 2 is earlier than that of the PDSCH transmission position 22, then the ACK/NACK 21 of the candidate PDSCH occasion 2 corresponds to the PDSCH transmission position 21, and the ACK/NACK 22 of the candidate PDSCH occasion 2 corresponds to the PDSCH transmission position 22. The candidate PDSCH occasion 3 only includes one PDSCH transmission position 31, so the ACK/NACK 31 of the candidate PDSCH occasion 3 corresponds to the PDSCH transmission position 31. It is assumed that the network device schedules a PDSCH of the URLLC service at the PDSCH transmission position 11 of the candidate PDSCH occasion 1, and schedules a PDSCH of the eMBB service at the PDSCH transmission position 12 of the candidate PDSCH occasion 1. A starting time of the PDSCH transmission position 12 is earlier than that of the PDSCH transmission position 11, therefore, the PDSCH transmission position 12 corresponding to the eMBB service corresponds to the ACK/NACK11, and the PDSCH transmission position 11 corresponding to the URLLC service corresponds to the ACK/NACK12.

In addition to determining the position sequence of HARQ-ACK information for a candidate PDSCH occasion, it may also be determined in the following manner, positions of multiple pieces of HARQ-ACK information corresponding to a candidate PDSCH occasion are determined based on a type of a service. For example, HARQ-ACK information in the HARQ-ACK codebook is determined according to a starting time domain position of the candidate PDSCH occasion. One candidate PDSCH occasion corresponds to two pieces of HARQ-ACK information, as shown in FIG. 7, the candidate PDSCH occasion 1 corresponds to the ACK/NACK11 and the ACK/NACK12, the candidate PDSCH occasion 2 corresponds to the ACK/NACK21 and the ACK/NACK22, and the candidate PDSCH occasion 3 corresponds to the ACK/NACK31 and the ACK/NACK32. Further, positions of multiple pieces of HARQ-ACK information corresponding to a candidate PDSCH occasion are determined based on a type of a service. For example, HARQ-ACK information with low service priority is placed at the top, as shown in FIG. 7, the ACK/NACK11 of the candidate PDSCH occasion 1 corresponds to a HARQ-ACK for eMBB service transmission, and the ACK/NACK12 of the candidate PDSCH occasion 1 corresponds to a HARQ-ACK for URLLC service transmission. Or, HARQ-ACK information with high service priority is at the top, the ACK/NACK11 of the candidate PDSCH occasion 1 corresponds to a HARQ-ACK for URLLC service transmission, and the ACK/NACK12 of the candidate PDSCH occasion 1 corresponds to a HARQ-ACK for eMBB service transmission, which is not shown in the figure.

It should be noted that, in the manner 1 and the manner 2, the terminal may fill the HARQ-ACK codebook according to an actually scheduled PDSCH and a transmission status of the PDSCH. For example, the terminal fills the ACK/NACK11 according to an actual reception status of the PDSCH for the eMBB service. For example, if reception is successful, an ACK is fed back, and if reception is not successful, a NACK is fed back. For example, the ACK/NACK12 is filled according to an actual reception status of the PDSCH for the URLLC service. For example, if reception is successful, an ACK is fed back, and if reception is not successful, a NACK is fed back. In addition, the terminal may use a special form to fill pieces of HARQ-ACK information (ACK/NACK21, ACK/NACK22, ACK/NACK31, etc.) corresponding to the candidate PDSCH occasion 2 and the candidate PDSCH occasion 3 that are not scheduled by the network device.

In the information transmission method of an embodiment of the present disclosure, in a scenario where the terminal supports simultaneous scheduling and reception of multiple services, providing feedback on multiple service transmissions received simultaneously may be realized, and reliability of simultaneous transmission of different services is improved.

Information transmission methods in different scenarios are introduced in the above embodiment, and a corresponding terminal will be further introduced in combination with the accompanying drawings.

Figure 8:
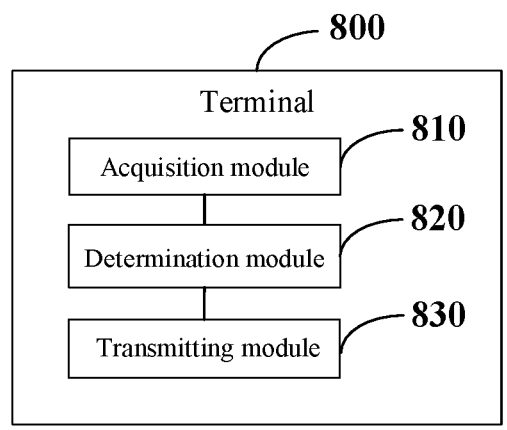
FIG. 8 shows a schematic structural diagram illustrating modules of a terminal according to an embodiment of the present disclosure.

As shown in FIG. 8, the terminal 800 of the embodiment of the present disclosure may realize details of the method for acquiring a non-overlapped candidate Physical Downlink Shared Channel (PDSCH) occasion in a time domain transmission unit, determining, according to the candidate PDSCH occasion, a Hybrid Automatic Repeat Request Acknowledge (HARQ-ACK) codebook corresponding to the time domain transmission unit; transmitting the HARQ-ACK codebook, and achieve the same effect, wherein, at least one candidate PDSCH occasion in the time domain transmission unit corresponds to at least two pieces of HARQ-ACK information; the terminal 800 specifically includes the following functional modules.

An acquisition module 810 is configured to acquire a non-overlapped candidate Physical Downlink Shared Channel (PDSCH) occasion in a time domain transmission unit.

A determination module 820 is configured to determine, according to the candidate PDSCH occasion, a Hybrid Automatic Repeat Request Acknowledge (HARQ-ACK) codebook corresponding to the time domain transmission unit; wherein, at least one candidate PDSCH occasion in the time domain transmission unit corresponds to at least two pieces of HARQ-ACK information.

A transmitting module 830 is configured to transmit the HARQ-ACK codebook.

The HARQ-ACK codebook includes n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit.

n is a predefined value, or n is a value determined based on terminal capability, or, n is a number of PDSCH transmission positions included in a target candidate PDSCH occasion, wherein the target candidate PDSCH is a candidate PDSCH that includes most PDSCH transmission positions in the time domain transmission unit.

The HARQ-ACK codebook includes $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion.

$n_m$ may be a number of PDSCH transmission positions included in the m-th candidate PDSCH occasion.

$n_m$ may has a first value when the number of PDSCH transmission positions included in the m-th candidate PDSCH occasion is greater than 1;

$n_m$ may has a second value when the number of PDSCH transmission positions included in the m-th candidate PDSCH occasion is equal to 1.

The first value and the second value are predefined, or the first value is determined based on terminal capability.

The HARQ-ACK information includes N bits, and N is a positive integer.

A position of HARQ-ACK information in the HARQ-ACK codebook is determined according to a time domain position of a candidate PDSCH occasion corresponding to the HARQ-ACK information.

The time domain transmission unit includes at least one slot.

It should be noted that, in a scenario where the terminal of an embodiment of the present disclosure supports simultaneous scheduling and reception of multiple services, the terminal may provide feedback on multiple service transmissions received simultaneously, and reliability of simultaneous transmission of different services is improved.

Figures 9, 10:
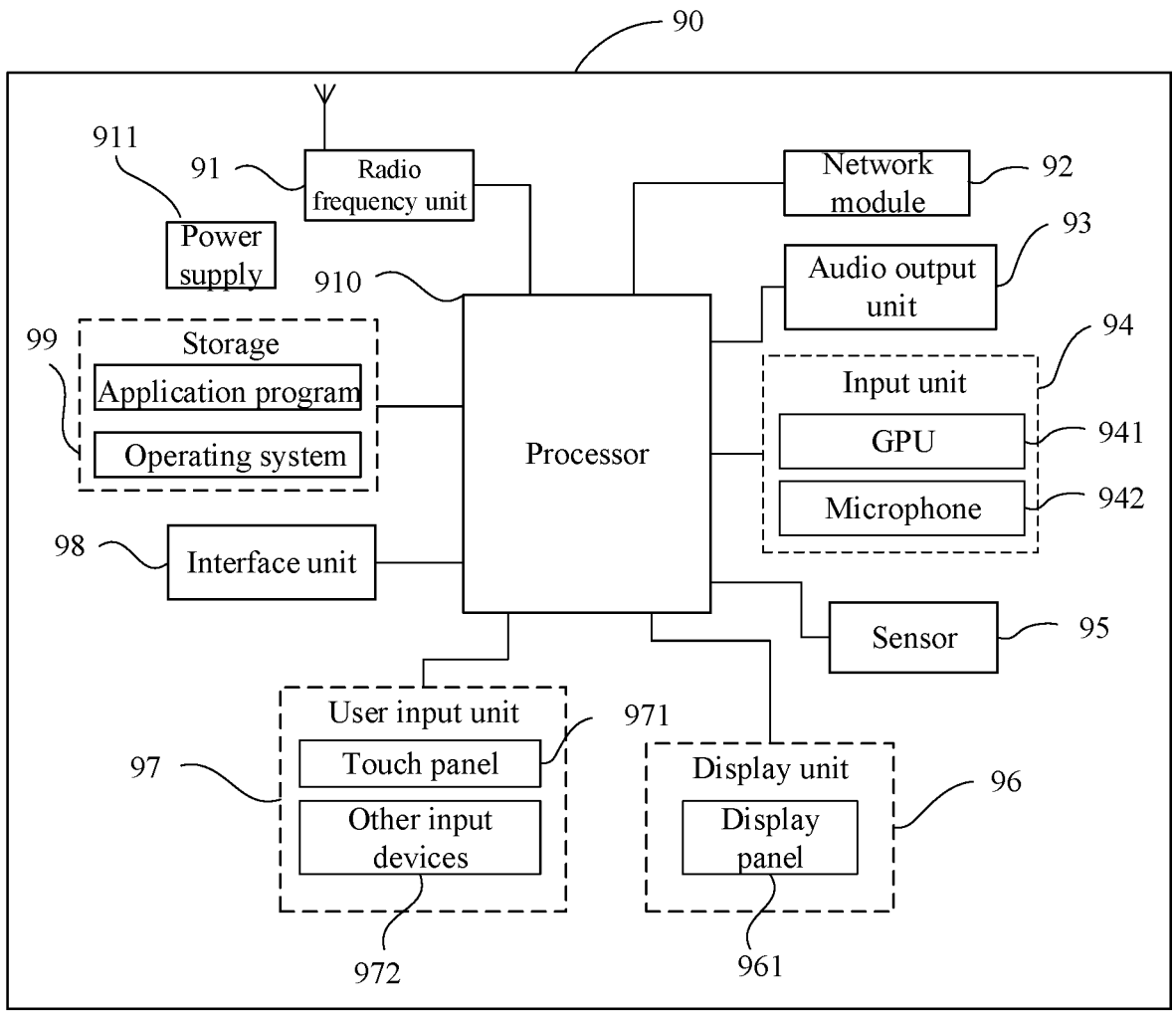
FIG. 9 is a block diagram of a terminal according to an embodiment of the present disclosure.
FIG. 10 is a first schematic flowchart illustrating an information transmission method at a network device side according to an embodiment of the present disclosure.

In order to better achieve the above purpose, FIG. 9 shows a schematic hardware structural diagram of a terminal that implements various embodiments of the present disclosure. The terminal 90 includes, but is not limited to, a radio frequency unit 91, a network module 92, and an audio output unit 93, an input unit 94, a sensor 95, a display unit 96, a user input unit 97, an interface unit 98, a storage 99, a processor 910, and a power supply 911 and other components. Those skilled in the art may understand that the structure of the terminal shown in FIG. 9 does not constitute a limitation on the terminal, and the terminal may include more or fewer components than shown in the figure, or some combined components, or different arrangements of components. In an embodiment of the present disclosure, the terminal includes, but is not limited to, a mobile phone, a tablet computer, a notebook computer, a palmtop computer, a car terminal, a wearable device, a pedometer, and the like.

The radio frequency unit 91 is configured to acquire a non-overlapped candidate Physical Downlink Shared Channel (PDSCH) occasion in a time domain transmission unit.

The processor 910 is configured to determine, according to the candidate PDSCH occasion, a HARQ-ACK codebook corresponding to the time domain transmission unit; where, at least one candidate PDSCH occasion in the time domain transmission unit corresponds to at least two pieces of HARQ-ACK information; and the radio frequency unit 91 is controlled to transmit the HARQ-ACK codebook.

The HARQ-ACK codebook includes n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit.

n is a predefined value, or n is a value determined based on terminal capability, or, n is a number of PDSCH transmission positions included in a target candidate PDSCH occasion, wherein the target candidate PDSCH is a candidate PDSCH that includes most PDSCH transmission positions in the time domain transmission unit.

The HARQ-ACK codebook includes $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion.

$n_m$ may be a number of PDSCH transmission positions included in the m-th candidate PDSCH occasion.

$n_m$ may has a first value when the number of PDSCH transmission positions included in the m-th candidate PDSCH occasion is greater than 1.

$n_m$ may has a second value when the number of PDSCH transmission positions included in the m-th candidate PDSCH occasion is equal to 1.

The first value and the second value are predefined, or the first value is determined based on terminal capability.

The HARQ-ACK information includes N bits, and N is a positive integer.

A position of HARQ-ACK information in the HARQ-ACK codebook is determined according to a time domain position of a candidate PDSCH occasion corresponding to the HARQ-ACK information.

The time domain transmission unit includes at least one slot.

In a scenario where the terminal of an embodiment of the present disclosure supports simultaneous scheduling and reception of multiple services, providing feedback on multiple service transmissions received simultaneously may be realized, and reliability of simultaneous transmission of different services is improved.

It should be understood that, in an embodiment of the present disclosure, the radio frequency unit 91 may be used to receive and send information or send and receive signals during a call. Specifically, downlink data from a base station is received and processed by the processor 910; in addition, uplink data is sent to the base station. Generally, the radio frequency unit 91 includes, but is not limited to, an antenna, at least one amplifier, a transceiver, a coupler, a low-noise amplifier, a duplexer, and the like. In addition, the radio frequency unit 91 may also communicate with a network and other devices through a wireless communication system.

The terminal provides users with wireless broadband Internet access through the network module 92, such as helping users to send and receive email, to browse web pages, and to access streaming media, etc.

The audio output unit 93 may convert audio data received by the radio frequency unit 91 or the network module 92 or stored in the storage 99 into audio signals and output them as sound. Moreover, the audio output unit 93 may also provide audio output (for example, call signal reception sound, message reception sound, etc.) related to a specific function performed by the terminal 90. The audio output unit 93 includes a speaker, a buzzer, a receiver, and the like.

The input unit 94 is used to receive audio signals or video signals. The input unit 94 may include a graphics processing unit (Graphics Processing Unit, GPU) 941 and a microphone 942, and the graphics processing unit 941 processes image data of a still picture or video obtained by an image capture device (such as a camera) in a video capture mode or an image capture mode. The processed image frames may be displayed on the display unit 96. The image frames processed by the graphics processing unit 941 may be stored in the storage 99 (or other storage medium) or transmitted via the radio frequency unit 91 or the network module 92. The microphone 942 may receive sound, and may process such sound into audio data. The processed audio data may be converted into a output format that may be transmitted to a mobile communication base station via the radio frequency unit 91 in the case of a telephone call mode.

The terminal 90 further includes at least one sensor 95, such as a light sensor, a motion sensor, and other sensors. Specifically, the light sensor includes an ambient light sensor and a proximity sensor, wherein the ambient light sensor may adjust brightness of a display panel 961 according to brightness of the ambient light, and the proximity sensor may turn off the display panel 961 and/or backlight in a case that the terminal 90 is moved to an ear. As a type of the motion sensor, an accelerometer sensor may detect a magnitude of acceleration in various directions (usually three axes), and detect a magnitude and direction of gravity in the case of stationary, and be used to identify attitude of the terminal (such as horizontal and vertical screen switching, related games, magnetometer attitude calibration), vibration recognition related functions (such as pedometer, tap), etc.; the sensor 95 may also include a fingerprint sensor, a pressure sensor, an iris sensor, a molecular sensor, a gyroscope, a barometer, a hygrometer, a thermometer, an infrared sensor and the like, which are not repeated here.

The display unit 96 may be configured to display information inputted by the user or information provided to the user. The display unit 96 may include the display panel 961, and the display panel 961 may be configured as a form of a liquid crystal display (Liquid Crystal Display, LCD), an organic light-emitting diode (Organic Light-Emitting Diode, OLED) or the like.

The user input unit 97 may be used to receive numeric information or character information input by a user and generate a signal input related to the user's settings and related to the function control of the terminal. Specifically, the user input unit 97 includes a touch panel 971 and other input devices 972. The touch panel 971, also referred to as a touch screen, may collect the user's touch operations thereon or nearby (such as the user's operation on the touch panel 971 or near the touch panel 971 using any suitable object or accessory such as a finger or a stylus). The touch panel 971 may include two parts, namely a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, transmits the coordinate to the processor 910, and may receive and execute a command from the processor 910. In addition, the touch panel 971 can be implemented in various types such as resistive, capacitive, infrared, and surface acoustic waves, etc. In addition to the touch panel 971, the user input unit 97 may further include other input devices 972. Specifically, the other input devices 972 may include, but are not limited to, a physical keyboard, a function button (such as a volume control button, a switch button, etc.), a trackball, a mouse, and a joystick, and details thereof are not described herein again.

Further, the touch panel 971 may cover the display panel 961, in a case that the touch screen 971 detects a touch operation thereon or nearby, the touch operation is transmitted to the processor 910 to determine the type of the touch event, then the processor 910 provides a corresponding visual output on the display screen 961 based on the type of the touch event. Although in FIG. 9, the touch panel 971 and the display panel 961 are implemented as two independent components to implement input and output functions of the terminal, in some embodiments, the touch panel 971 and the display panel 961 may be integrated to implement the input and output functions of the terminal, which are not limited here.

The interface unit 98 is an interface through which an external device is connected to the terminal 90. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 98 may be used to receive input (e.g., data information, power, etc.) from the external device and transmit the received input to one or more elements within the terminal 90 or may be used to transmit data between the terminal 90 and the external device.

The storage 99 may be used to store software programs and various data. The storage 99 may mainly include a storage program area and a storage data area, wherein the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 99 may include a high-speed random access storage, and may further include a non-volatile storage, such as at least one magnetic disk storage device, a flash memory device, or other volatile solid-state storage device.

The processor 910 is a control center of the terminal, and uses various interfaces and lines to connect various parts of the entire terminal. By running or executing software programs and/or modules stored in the storage 99 and calling data stored in the storage 99, various functions of the terminal and processing data are performed, so that the overall monitoring of the terminal is performed. The processor 910 may include one or more processing units; optionally, the processor 910 may integrate an application processor and a modem processor, wherein the application processor mainly processes an operating system, a user interface, and an application program, etc. The modem processor mainly handles wireless communication. It could be understood that the modem processor may not be integrated into the processor 910.

The terminal 90 may further include a power source 911 (such as a battery) for supplying power to various components. Optionally, the power supply 911 may be logically connected to the processor 910 through a power management system, so as to implement functions such as management of charging, management of discharging, and power consumption management through the power management system.

In addition, the terminal 90 includes some functional modules that are not shown, and details are not described herein again.

Optionally, an embodiment of the present disclosure further provides a terminal, and the terminal includes: a processor 910, a storage 99, and a computer program stored in the storage 99 and executable on the processor 910, the computer program is used to executed by the processor 910 to implement various processes in the embodiment of the information transmission method, and the same technical effect may be achieved, which will not be repeated herein to avoid repetition. The terminal may be a wireless terminal or a wired terminal, and the wireless terminal may be a device that provides voice and/or other service data connectivity to the user, a handheld device having a wireless connecting function, or another processing device connected to a wireless modem. The wireless terminal may communicate with one or more core networks via a radio access network (Radio Access Network, RAN), and the wireless terminal may be a mobile terminal, such as a mobile phone (or referred to as "cellular" phone) and a computer having a mobile terminal, for example, a portable device, a pocket device, a handheld device, a computer built-in device or an in-vehicle mobile device that exchanges language and/or data with a wireless access network, for example, a personal communication service (Personal Communication Service, PCS) telephone, a cordless telephone, a session initiation protocol (Session Initiation Protocol, SIP) telephone, a wireless local loop (Wireless Local Loop, WLL) station, a personal digital assistant (Personal Digital Assistant, PDA) and other devices. The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), and an access terminal (Access Terminal), a user terminal (User Terminal), a user agent (User Agent), or a user equipment or a user device (User Equipment or User Device), which are not limited herein.

An embodiment of the present disclosure also provides a computer readable storage medium, the computer program is stored on the computer readable storage medium, and the computer program is executed by a processor to implement various processes in the embodiment of the information transmission method, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

The above embodiments introduce the information transmission method of the present disclosure from the terminal side, and the information transmission method at a network device side will be further introduced with reference to the accompanying drawings.

As shown in FIG. 10, an information transmission method of an embodiment of present disclosure is applied on a network device side, and the method includes the following steps.

Step 101: receiving a HARQ-ACK codebook corresponding to a non-overlapped candidate Physical Downlink Shared Channel (PDSCH) occasion in a time domain transmission unit.

The time domain transmission unit may be a time domain resource unit for semi-static scheduling of PDSCH of a network device. A time domain transmission unit includes at least one slot. Taking one slot as an example, at least one non-overlapped candidate PDSCH occasion (occasion) may be included within one slot, for example, three non-overlapped candidate PDSCH occasions are included within one slot, namely, candidate PDSCH occasion 1, candidate PDSCH occasion 2 and candidate PDSCH occasion 3. Further, a time domain transmission unit may include at least one candidate PDSCH occasion, one candidate PDSCH occasion may include at least one PDSCH transmission position. A number of PDSCH transmission positions included in different candidate PDSCH occasions may be different. For example, candidate PDSCH occasion 1 includes three PDSCH transmission positions, candidate PDSCH occasion 2 includes two PDSCH transmission positions, and candidate PDSCH occasion 1 includes one PDSCH transmission position. For the HARQ-ACK codebook, at least one candidate PDSCH occasion in the time domain transmission unit corresponds to at least two pieces of HARQ-ACK information, that is, there is at least one candidate PDSCH occasion corresponding to at least two pieces of HARQ-ACK information in the time domain transmission unit. It should be noted that, there may also be a candidate PDSCH occasion corresponding to one piece of HARQ-ACK information in the time domain transmission unit.

In a case that the network device schedules PDSCHs of different services to different PDSCH transmission positions of a same candidate PDSCH occasion, ACK-ACK information corresponding to each PDSCH occasion in the candidate PDSCH occasion may be used to provide transmission feedback on the PDSCHs of different services, so that providing feedback on multiple service transmissions received simultaneously may be realized, and reliability of simultaneous transmission of different services is improved.

The HARQ-ACK codebook includes n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit. In this manner, a number of pieces of HARQ-ACK information actually corresponding to each candidate PDSCH in the time domain transmission unit is the same. The determination of a value of then includes, but is not limited to, the following manners: n may be a predefined value, for example, n is defined as 2 in a protocol. Or, n may be a value determined based on terminal capability, for example, the terminal may support reception of PDSCHs of two services, so n is determined to be 2. Or, n may be a number of PDSCH transmission positions included in a target candidate PDSCH occasion, wherein the target candidate PDSCH is a candidate PDSCH that includes most PDSCH transmission positions in the time domain transmission unit. For example, the candidate PDSCH occasion 1 and the candidate PDSCH occasion 3 in the time domain transmission unit include one PDSCH transmission position, and the candidate PDSCH occasion 2 includes two PDSCH transmission positions, so n is 2.

The HARQ-ACK codebook includes $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion. In this manner, a number of pieces of HARQ-ACK information actually corresponding to each candidate PDSCH in the time domain transmission unit may be different. Specifically, $n_m$ is a number of PDSCH transmission positions included in the m-th candidate PDSCH occasion. In this manner, a number of pieces of HARQ-ACK information corresponding to each candidate PDSCH occasion is the same as a number of PDSCH transmission positions included in each PDSCH candidate occasion. In addition, $n_m$ may also be determined according to the number of PDSCH transmission positions included in the m-th candidate PDSCH occasion. Specifically, $n_m$ may has a first value when the number of PDSCH transmission positions included in the m-th candidate PDSCH occasion is greater than 1; $n_m$ may has a second value when the number of PDSCH transmission positions included in the m-th candidate PDSCH occasion is equal to 1. The first value and the second value are predefined. For example, the first value is defined as 2 and the second value is defined as 1 in a protocol. Or, the first value is determined based on terminal capability, for example, the terminal may support reception of PDSCHs of two services, so the first value is determined to be 2.

A position of HARQ-ACK information in the HARQ-ACK codebook is determined according to a time domain position of a candidate PDSCH occasion corresponding to the HARQ-ACK information. Further, positions of multiple pieces of HARQ-ACK information corresponding to one candidate PDSCH occasion are determined according to a starting time domain position of a PDSCH transmission position in this candidate PDSCH occasion. Or, positions of multiple pieces of HARQ-ACK information corresponding to a candidate PDSCH occasion are determined based on a type of a service. The HARQ-ACK information includes N bits, and N is a positive integer.

Figure 11:
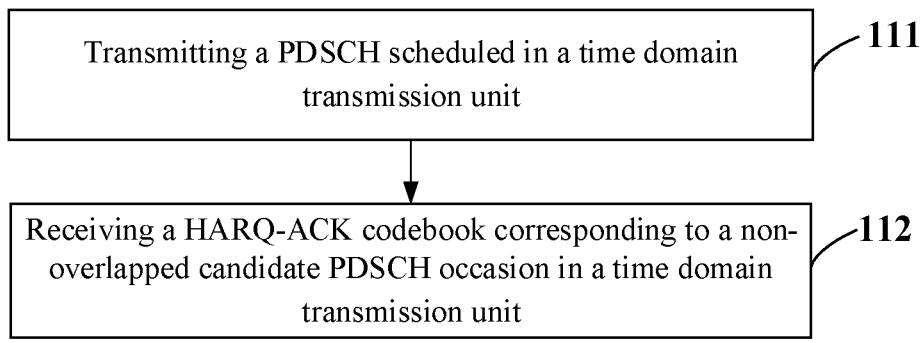
FIG. 11 is a second schematic flowchart illustrating an information transmission method at a network device side according to an embodiment of the present disclosure.

As shown in FIG. 11, the information transmission method includes Step 111 to Step 112.

Step 111: transmitting a PDSCH scheduled in a time domain transmission unit.

The sent PDSCH may be or may not be of the same service. It is assumed that the network device schedules a PDSCH of the URLLC service at the PDSCH transmission position 11 of the candidate PDSCH occasion 1, and schedules a PDSCH of the eMBB service at the PDSCH transmission position 12 of the candidate PDSCH occasion 1.

Step 112: receiving a HARQ-ACK codebook corresponding to a non-overlapped candidate PDSCH occasion in a time domain transmission unit.

If the HARQ-ACK codebook determined by the terminal includes n*M pieces of HARQ-ACK information, wherein n is 2, then PDSCH transmission position 12 corresponding to eMBB service corresponds to ACK/NACK11, and PDSCH transmission position 11 corresponding to URLLC service corresponds to ACK/NACK12. The terminal fills the ACK/NACK11 according to an actual reception status of the PDSCH for the eMBB service. For example, if reception is successful, an ACK is fed back, and if reception is not successful, a NACK is fed back. The ACK/NACK12 is filled according to an actual reception status of the PDSCH for the URLLC service. For example, if reception is successful, an ACK is fed back, and if reception is not successful, a NACK is fed back. In addition, it should be noted that, the terminal may use a special form to fill pieces of HARQ-ACK information (ACK/NACK21, ACK/NACK22, ACK/NACK31, etc.) corresponding to the candidate PDSCH occasion 2 and the candidate PDSCH occasion 3 that are not scheduled by the network device. In this way, the network device may determine a transmission status of a scheduled PDSCH by analyzing a HARQ-ACK codebook fed back by a terminal to ensure reliability of downlink transmission.

In the information transmission method of an embodiment of the present disclosure, in a scenario where the terminal supports simultaneous scheduling and reception of multiple services, the network device may receive feedback information of the terminal on multiple service transmissions received simultaneously, and reliability of simultaneous transmission of different services is improved.

The above embodiments respectively describe in detail the information transmission method in different scenarios. Corresponding network device thereof will be further introduced in the following embodiment in combination with the accompanying drawings.

Figure 12:
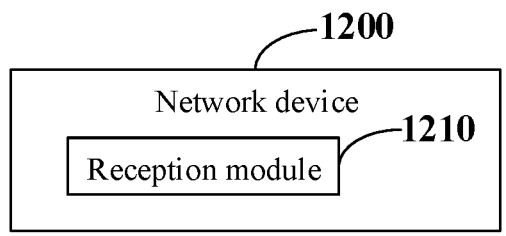
FIG. 12 is a schematic structural diagram illustrating a module of a network device according to an embodiment of the present disclosure.

As shown in FIG. 12, the network device 1200 of the embodiment of the present disclosure may realize details of the method for receiving a HARQ-ACK codebook corresponding to a non-overlapped candidate Physical Downlink Shared Channel (PDSCH) occasion in a time domain transmission unit, and achieve the same effect, where, at least one candidate PDSCH occasion in the time domain transmission unit corresponds to at least two pieces of HARQ-ACK information. The network device 1200 specifically includes the following functional modules.

A reception module 1210 is configured to receive a HARQ-ACK codebook corresponding to a non-overlapped candidate Physical Downlink Shared Channel (PDSCH) occasion in a time domain transmission unit; where, at least one candidate PDSCH occasion in the time domain transmission unit corresponds to at least two pieces of HARQ-ACK information.

The HARQ-ACK codebook includes n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit.

n is a predefined value, or n is a value determined based on terminal capability, or, n is a number of PDSCH transmission positions included in a target candidate PDSCH occasion, wherein the target candidate PDSCH is a candidate PDSCH that includes most PDSCH transmission positions in the time domain transmission unit.

The HARQ-ACK codebook includes $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion.

$n_m$ is a number of PDSCH transmission positions included in the m-th candidate PDSCH occasion.

$n_m$ may has a first value when the number of PDSCH transmission positions included in the m-th candidate PDSCH occasion is greater than 1;

$n_m$ may has a second value when the number of PDSCH transmission positions included in the m-th candidate PDSCH occasion is equal to 1.

The first value and the second value are predefined, or the first value is determined based on terminal capability.

The HARQ-ACK information includes N bits, and N is a positive integer.

A position of HARQ-ACK information in the HARQ-ACK codebook is determined according to a time domain position of a candidate PDSCH occasion corresponding to the HARQ-ACK information.

The time domain transmission unit includes at least one slot.

It should be noted that a division of modules of the above network device and terminal is only a division in terms of logical functions. In actual implementation, the modules may be entirely or partially integrated into one physical entity, or may be physically separated. The modules may all be implemented in a form of software called by a processing component; or may all be implemented in a form of hardware, or some of the modules may be implemented in the form of software called by a processing component, and some of the modules are implemented in the form of hardware. For example, the determination module may be a processing component arranged independently, or may be integrated in a chip of the above-mentioned devices. In addition, the determination module may also be stored in the storage of the above device in a form of program codes called and executed by a processing component of the above device to implement the function of the determination module. Implementation of other modules is similar. In addition, all or a part of these modules may be integrated or implemented independently. The processing components described herein may be an integrated circuit having a processing capability of signals. In an implementation process, each step of the above method or each of the above modules may be completed by an integrated logic circuit in hardware in the processor component or by an instruction in a form of software.

For example, the above modules may be one or more integrated circuits configured to implement the above method, such as one or more application specific integrated circuits (Application Specific Integrated Circuit, ASIC), or one or more digital signal processors (digital signal processor, DSP), or, one or more field programmable gate arrays (Field Programmable Gate Array, FPGA), etc. As another example, when one of the above modules is implemented in a form of program codes invoked by a processing component, the processing component may be a general purpose processor, such as a central processing unit (Central Processing Unit, CPU) or another processor capable of calling the program codes. As another example, these modules may be integrated and implemented in a form of a system-on-a-chip (system-on-a-chip, SOC).

It should be noted that, in a scenario where the terminal supports simultaneous scheduling and reception of multiple services, the network device in the embodiment of the present disclosure may receive feedback information of the terminal on multiple service transmissions received simultaneously, and reliability of simultaneous transmission of different services is improved.

In order to better achieve the above purpose, an embodiment of the present disclosure also provides a network device including a processor and a storage, the storage stores a computer program executable by the processor, and the computer program is executed by the processor to implement steps of the information transmission method as described above. An embodiment of the present disclosure also provides a computer readable storage medium including a computer program stored thereon, and the computer program is executed by the processor to implement steps of the information transmission method as described above.

Figure 13:
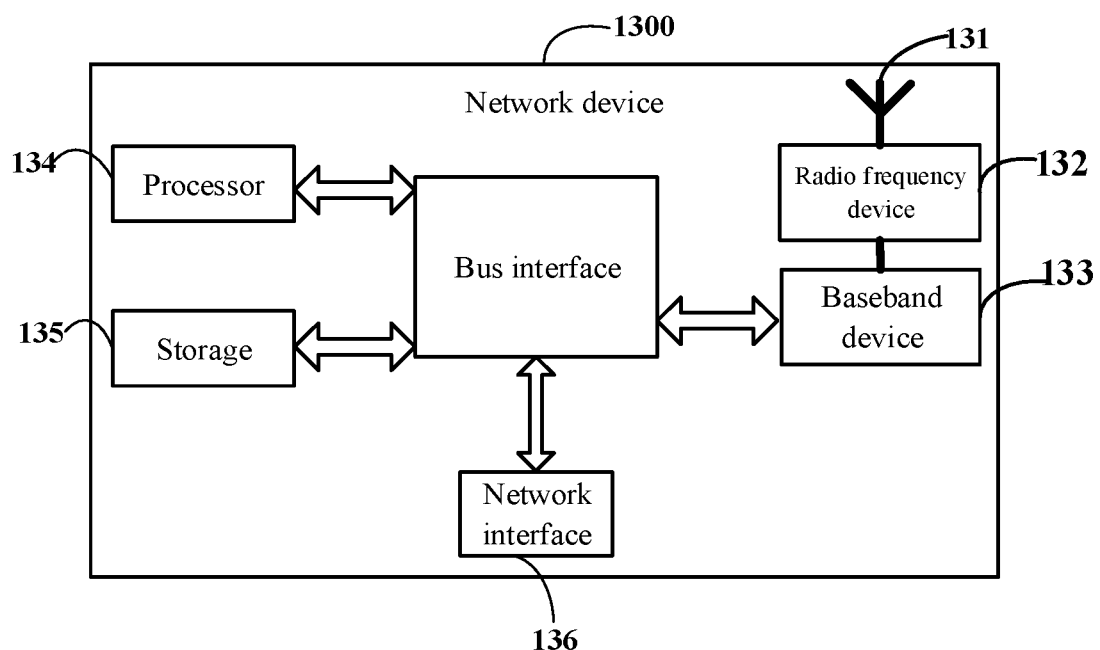
FIG. 13 is a block diagram illustrating a network device according to an embodiment of the present disclosure.

Specifically, an embodiment of the present disclosure also provides a network device. As shown in FIG. 13, the network device 1300 includes: an antenna 131, a radio frequency device 132, and a baseband device 133. The antenna 131 is connected to the radio frequency device 132. In an uplink direction, the radio frequency device 132 receives information via the antenna 131 and transmits the received information to the baseband device 133 for processing. In a downlink direction, the baseband device 133 processes information to be transmitted and transmits it to the radio frequency device 132. The radio frequency device 132 processes the received information and transmits it via the antenna 131.

The frequency band processing device may be arranged in the baseband device 133, and the method performed by the above network device in the embodiments may be implemented in the baseband device 133, and the baseband device 133 includes a processor 134 and a storage 135.

The baseband device 133 may include, for example, at least one baseband board on which a plurality of chips are disposed, as shown in FIG. 13, and one of the chips is, for example, the processor 134 connected to the storage 135 to call a program in the storage 135 to perform an operation of the network device shown in the above method embodiment.

The baseband device 133 may further include a network interface 136 for interacting with the radio frequency device 132, and the interface is, for example, a common public radio interface (common public radio interface, referred to as CPRI).

The processor here may be a processor or a collective name of a plurality of processing components. For example, the processor may be a CPU, an ASIC, or one or more integrated circuits configured to implement the method performed by the above network device, such as one or more digital signal processors (DSPs), or one or more field programmable gate arrays (FPGAs), etc. The storage element may be a storage or a collective name of a plurality of storage elements.

The storage 135 may be either a volatile storage or a non-volatile storage, or may include both a volatile storage and a non-volatile storage. The non-volatile storage may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile storage may be a random access memory (Random Access Memory, RAM) that acts as an external cache. By way of example and not limitation, many forms of RAM are available, such as a static RAM (Static RAM, SRAM), a dynamic RAM (Dynamic RAM, DRAM), a synchronous DRAM (Synchronous DRAM, SDRAM), a double data rate SDRAM (Double Data Rate SDRAM, DDRSDRAM), an enhanced SDRAM (Enhanced SDRAM, ESDRAM), a synchlink DRAM (Synchlink DRAM, SLDRAM) and a direct rambus RAM (Direct Rambus RAM, DRRAM). The storage 135 described in the present disclosure is intended to include, but is not limited to, these and any other suitable types of storage.

Figure 3:
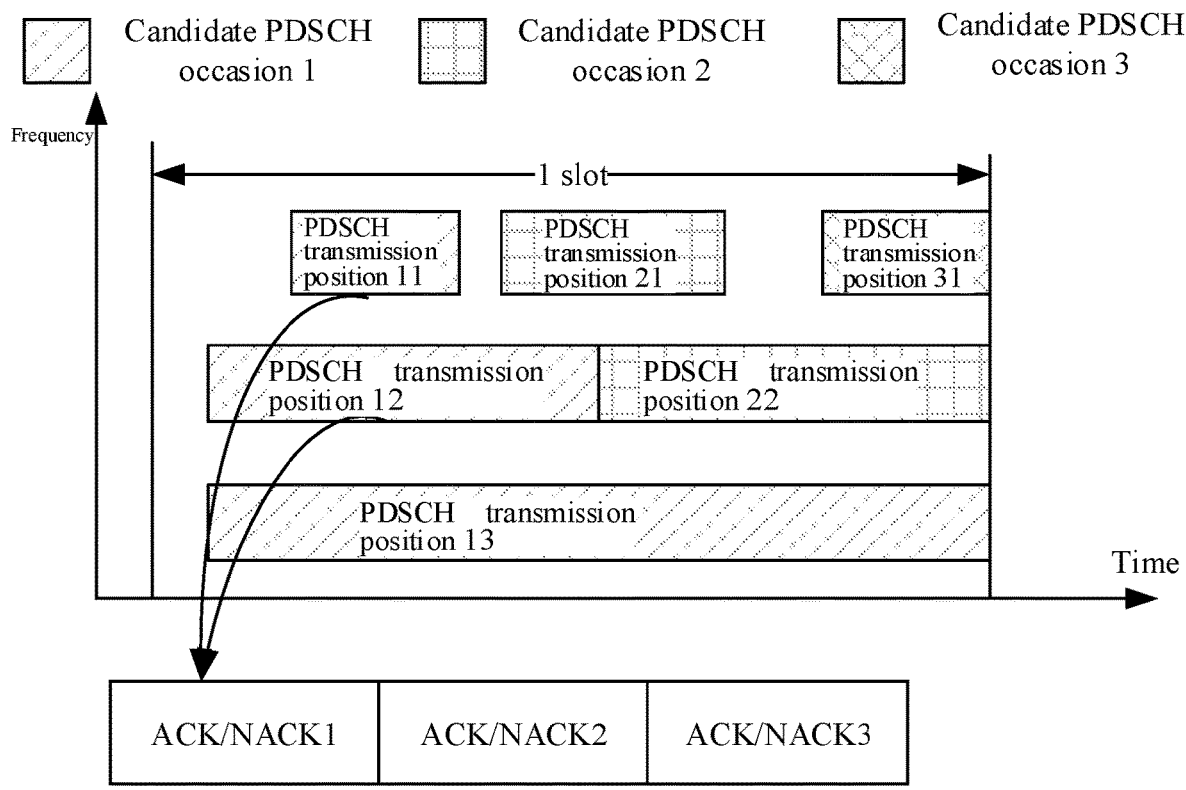
FIG. 3 shows a schematic diagram of a mapping relationship between a HARQ-ACK codebook and PDSCHs of different services.

Specifically, the network device of the embodiment of the present disclosure further includes: a computer program stored in the storage 135 and executable by the processor 134. The processor 134 calls the computer program in the storage 135 to execute the method executed by each module shown in FIG. 3.

Specifically, the computer program is called by the processor 134 to implement: receiving a HARQ-ACK codebook corresponding to a non-overlapped candidate Physical Downlink Shared Channel (PDSCH) occasion in a time domain transmission unit; wherein, at least one candidate PDSCH occasion in the time domain transmission unit corresponds to at least two pieces of HARQ-ACK information.

The HARQ-ACK codebook includes n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit.

n is a predefined value, or n is a value determined based on terminal capability, or, n is a number of PDSCH transmission positions included in a target candidate PDSCH occasion, wherein the target candidate PDSCH is a candidate PDSCH that includes most PDSCH transmission positions in the time domain transmission unit.

The HARQ-ACK codebook includes $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion.

$n_m$ is a number of PDSCH transmission positions included in the m-th candidate PDSCH occasion.

$n_m$ has a first value when the number of PDSCH transmission positions included in the m-th candidate PDSCH occasion is greater than 1;

$n_m$ has a second value when the number of PDSCH transmission positions included in the m-th candidate PDSCH occasion is equal to 1.

The first value and the second value are predefined, or the first value is determined based on terminal capability.

The HARQ-ACK information includes N bits, and N is a positive integer.

A position of HARQ-ACK information in the HARQ-ACK codebook is determined according to a time domain position of a candidate PDSCH occasion corresponding to the HARQ-ACK information.

The time domain transmission unit includes at least one slot.

The network device may be a base transceiver station (Base Transceiver Station, BTS) in a global system of mobile communication (Global System of Mobile communication, GSM) or code division multiple access (Code Division Multiple Access, CDMA), a NodeB (NodeB, NB) in wideband code division multiple access (Wideband Code Division Multiple Access, WCDMA), an evolved Node B (eNB or eNodeB) in LTE, or a relay station or an access point, or a base station in a future 5G network, etc., which is not limited here.

In a scenario where the terminal supports simultaneous scheduling and reception of multiple services, the network device in the embodiment of the present disclosure may receive feedback information of the terminal on multiple service transmissions received simultaneously, and reliability of simultaneous transmission of different services is improved.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to be beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In embodiments provided in the present application, it should be understood that the disclosed devices and methods may be implemented in other manners. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. Some or all of the units may be selected based on actual needs to achieve the purpose of the technical solution of the embodiments.

In addition, each functional unit in various embodiments of the present disclosure may be integrated into one processing unit, or each unit may exist physically separately, or two or more units may be integrated into one unit.

If the functions are implemented in the form of software functional units as an independent product for sale or use, the software functional units may also be stored in a computer readable storage medium. Based upon such understanding, the technical solutions of the present disclosure essentially or a part thereof contributing to the prior art may be embodied in the form of a computer software product which may be stored in a storage medium and which includes several instructions to cause a computer device (which may be a personal computer, a server, or a network device, etc.) to perform all or some steps of the method according to the respective embodiments of the present disclosure. The foregoing storage medium includes various media that may store program codes, such as a USB flash drive, a mobile hard disk, a ROM, a RAM, a magnetic disk, or an optical disk.

In addition, it should be noted that in the device and the method of the present disclosure, it is apparent that various components or various steps may be decomposed and/or recombined. The decomposition and/or recombination should be considered as equivalents of the present disclosure. Also, the steps of performing the above-described series of processes may naturally be performed in a chronological order or in an order illustrated, but not necessarily be required to be performed in a chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or a computing device network, in forms of hardware, firmware, software, or a combination thereof, which may be implemented by these of ordinary skills in the art using their basic programming skills after they read the description of the present disclosure.

Accordingly, the objects of the present disclosure may also be achieved by running a program or a set of programs on any computing device. The computing device may be a well-known general purpose device. Accordingly, the objects of the present disclosure may also be realized by merely providing a program product including program code for implementing the method or device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, it is apparent that various components or steps may be decomposed and/or recombined. The decomposition and/or recombination should be considered as equivalents of the present disclosure. Also, the steps of performing the series of processes described above may naturally be performed in the chronological order in the order illustrated, but not necessarily be required to be performed in the chronological order. Certain steps may be performed in parallel or independently of one another.

The descriptions above are optional embodiments of the present disclosure. It should be noted that those skilled in the art may make various improvements and the embellishments within the scope of the present disclosure, and the various improvements and the embellishments shall be within the protection scope of the present disclosure.

What is claimed is:

1. An information transmission method, applied on a terminal side, comprising:
    acquiring a non-overlapped candidate Physical Downlink Shared Channel (PDSCH) occasion in a time domain transmission unit, wherein the time domain transmission unit comprises at least one slot, at least two non-overlapped candidate PDSCH occasions are comprised within one slot;
    determining, according to the candidate PDSCH occasion, a Hybrid Automatic Repeat Request Acknowledge (HARQ-ACK) codebook corresponding to the time domain transmission unit; wherein, at least one candidate PDSCH occasion in the time domain transmission unit corresponds to at least two pieces of HARQ-ACK information; transmitting the HARQ-ACK codebook, wherein the HARQ-ACK codebook comprises n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit.

2. The information transmission method according to claim 1, wherein, n is a predefined value, or n is a value determined based on terminal capability, or, n is a number of PDSCH transmission positions comprised in a target candidate PDSCH occasion, wherein the target candidate PDSCH is a candidate PDSCH that comprises most PDSCH transmission positions in the time domain transmission unit.

3. The information transmission method according to claim 1, wherein the HARQ-ACK codebook comprises $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion.

4. The information transmission method according to claim 3, wherein $n_m$ is a number of PDSCH transmission positions comprised in the m-th candidate PDSCH occasion.

5. The information transmission method according to claim 3, wherein $n_m$ has a first value when the number of PDSCH transmission positions comprised in the m-th candidate PDSCH occasion is greater than 1;

$n_m$ has a second value when the number of PDSCH transmission positions comprised in the m-th candidate PDSCH occasion is equal to 1.

6. The information transmission method according to claim 5, wherein, the first value and the second value are predefined, or the first value is determined based on terminal capability.

7. The information transmission method according to claim 1, wherein the HARQ-ACK information comprises N bits, and N is a positive integer.

8. The information transmission method according to claim 1, wherein a position of HARQ-ACK information in the HARQ-ACK codebook is determined according to a time domain position of a candidate PDSCH occasion corresponding to the HARQ-ACK information.

9. The information transmission method according to claim 1, wherein the time domain transmission unit comprises at least one slot.

10. A terminal, comprising a processor, a storage and a program stored on the storage and executable by the processor, wherein, the program is executed by the processor to implement steps of an information transmission method, the method comprising:

acquiring a non-overlapped candidate Physical Downlink Shared Channel (PDSCH) occasion in a time domain transmission unit, wherein the time domain transmission unit comprises at least one slot, at least two non-overlapped candidate PDSCH occasions are comprised within one slot;

determining, according to the candidate PDSCH occasion, a Hybrid Automatic Repeat Request Acknowledge (HARQ-ACK) codebook corresponding to the time domain transmission unit; wherein, at least one candidate PDSCH occasion in the time domain transmission unit corresponds to at least two pieces of HARQ-ACK information; transmitting the HARQ-ACK codebook, wherein the HARQ-ACK codebook comprises n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit.

11. The terminal according to claim 10, wherein, n is a predefined value, or n is a value determined based on terminal capability, or, n is a number of PDSCH transmission positions comprised in a target candidate PDSCH occasion, wherein the target candidate PDSCH is a candidate PDSCH that comprises most PDSCH transmission positions in the time domain transmission unit.

12. The terminal according to claim 10, wherein the HARQ-ACK codebook comprises $\Sigma_{m=1}^{M} n_m$ pieces of HARQ-ACK information, wherein M is a number of non-overlapped candidate PDSCH occasions in the time domain transmission unit, and $n_m$ is a number of pieces of HARQ-ACK information corresponding to an m-th candidate PDSCH occasion.

13. The terminal according to claim 12, wherein $n_m$ is a number of PDSCH transmission positions comprised in the m-th candidate PDSCH occasion.

14. The terminal according to claim 12, wherein $n_m$ has a first value when the number of PDSCH transmission positions comprised in the m-th candidate PDSCH occasion is greater than 1;

$n_m$ has a second value when the number of PDSCH transmission positions comprised in the m-th candidate PDSCH occasion is equal to 1.

15. The terminal according to claim 14, wherein, the first value and the second value are predefined, or the first value is determined based on terminal capability.

16. The terminal according to claim 10, wherein the HARQ-ACK information comprises N bits, and N is a positive integer.

17. The terminal according to claim 10, wherein a position of HARQ-ACK information in the HARQ-ACK codebook is determined according to a time domain position of a candidate PDSCH occasion corresponding to the HARQ-ACK information.

18. A computer readable storage medium, wherein a program is stored on the computer readable storage medium, the program is executed by a processor to implement steps of an information transmission method, the method comprising:

acquiring a non-overlapped candidate Physical Downlink Shared Channel (PDSCH) occasion in a time domain transmission unit, wherein the time domain transmission unit comprises at least one slot, at least two non-overlapped candidate PDSCH occasions are comprised within one slot;

determining, according to the candidate PDSCH occasion, a Hybrid Automatic Repeat Request Acknowledge (HARQ-ACK) codebook corresponding to the time domain transmission unit; wherein, at least one candidate PDSCH occasion in the time domain transmission unit corresponds to at least two pieces of HARQ-ACK information; transmitting the HARQ-ACK codebook, wherein the HARQ-ACK codebook comprises n*M pieces of HARQ-ACK information, wherein M is a number of non-overlapped candidate PDSCH occasions in the time domain transmission unit, and n is a number of pieces of HARQ-ACK information corresponding to each candidate PDSCH occasion in the time domain transmission unit.

* * * * *